United States Patent
Hsu et al.

(10) Patent No.: US 7,545,458 B2
(45) Date of Patent: Jun. 9, 2009

(54) DISPLAY DEVICE COMPRISING A LIQUID CRYSTAL MODULE DEFINING A PLURALITY OF POSITIONING COLUMNS ALONG EACH EDGE OF A TOP SURFACE THEREOF

(75) Inventors: Tung-Ming Hsu, Tu-Cheng (TW); Chien-Min Chen, Tu-Cheng (TW); Ming-Fu Hsu, Tu-Cheng (TW); Shi-Ping Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 244 days.

(21) Appl. No.: 11/309,620

(22) Filed: Sep. 1, 2006

(65) Prior Publication Data

US 2007/0216825 A1 Sep. 20, 2007

(51) Int. Cl.
*G02F 1/1333* (2006.01)

(52) U.S. Cl. ....................................... 349/58
(58) Field of Classification Search ..................... 349/58
See application file for complete search history.

(56) References Cited

U.S. PATENT DOCUMENTS

| 2001/0017774 A1 | 8/2001 | Ito et al. | |
|---|---|---|---|
| 2003/0122995 A1* | 7/2003 | Park et al. | 349/58 |
| 2004/0141102 A1* | 7/2004 | Lin | 349/58 |
| 2005/0068469 A1* | 3/2005 | Kim | 349/58 |
| 2006/0187376 A1* | 8/2006 | Wang et al. | 349/62 |

FOREIGN PATENT DOCUMENTS

CN 387297.1 3/2003

* cited by examiner

*Primary Examiner*—Andrew Schechter
*Assistant Examiner*—Charles Chang
(74) *Attorney, Agent, or Firm*—Clifford O. Chi

(57) ABSTRACT

A frame includes a frame body and a plurality of fixing units. The frame body includes a base and a plurality of sidewalls extending from the peripheral of the base, the base and the sidewalls cooperatively forming a receiving cavity to receive the liquid crystal module. The fixing units are configured for enclosing the sidewalls and confining the liquid crystal module into the receiving cavity of the frame body. Each fixing unit is securely bounded with the liquid crystal module and the sidewall of the frame body respectively. A display device using the frame is also provided, which can be assembled efficiently and decreases the cost of materials.

4 Claims, 9 Drawing Sheets

DISPLAY DEVICE COMPRISING A LIQUID CRYSTAL MODULE DEFINING A PLURALITY OF POSITIONING COLUMNS ALONG EACH EDGE OF A TOP SURFACE THEREOF

FIELD OF THE INVENTION

The present invention relates to frame designs, and display devices using the same, more particularly, to liquid crystal display devices.

DISCUSSION OF THE RELATED ART

Cathode ray tube (CRT) devices—a type of display device that has been widely used for television monitors, measuring instruments, and information terminals. However, the CRT has limits on miniaturization and weight. With a trend and demand of miniaturization and weight lightness in electronic machines, display devices such as a liquid crystal display (LCD) device using an electro-optics effect, a plasma display panel (PDP) using a gas discharge, and an electro luminescence display (ELD) device using an electro-luminescence effect have been actively studied as a substitute for the CRT.

Among the above mentioned display devices, the LCD devices are most actively studied because the LCD devices realize excellent picture quality, low power consumption, and low heat emission as compared with those of the CRT. Herein, the LCD devices include main components such as a liquid crystal module (hereinafter, referred to as an "LCM") and a frame. The LCM, a flat display device, has a backlight and an LCD panel. The LCM is combined with the frame, and then is mounted on a monitor.

Referring to FIG. 8, a typical LCD device 10 is shown. The LCD device 10 includes a bottom frame 11, an upper frame 12, and an LCM 13. The bottom frame 11 includes a base 112 and four sidewalls 113 perpendicularly extending from the peripheral of the base 112, the base 112 and the sidewalls 113 cooperatively defining a receiving cavity 15 to receive the LCM 13. The upper frame 12 includes an upper base 121 and four sidewalls 123 extending perpendicularly from the upper base 121. The upper base 121 defines an opening 1215 in the interior thereof and forms four frame edges 1216. A display part of the LCM 13 is exposed through the opening 1215 of the upper base 121. The sidewalls 123 of the upper frame 12 and the sidewall 113 of the bottom frame 11 respectively define a plurality of locking elements 16 thereon, thereby the upper frame 12 and the bottom frame 111 can be assembled together with the help of the locking elements 16, and the LCM 13 is secured in the receiving cavity 15. However, the upper frame 12 is typically integrally manufactured by stamping a metal sheet. This stamping method is disadvantageous because a cutout portion of the metal sheet is wasted. If the cutout portion, due to its small size, cannot be used for stamping smaller frames, this material will be wasted, increasing the cost of manufacture.

Referring to FIG. 9, another typical LCD device 20 is shown. The LCD device 20 includes an LCM 23 and four side frames 21. Each side frame 21 includes a connecting plate 212, and two opposite fixing plate 211 extending perpendicularly out from two opposite edges of the connecting plate 212. The connecting plate 212 is an elongated thin sheet having a rectangular shape. Each fixing plate 211 is an elongated thin sheet having an isosceles trapezium shape extending from a longer edge of the connecting plate 212. Accordingly, the two fixing plate 211 and the connecting plate 212 cooperatively defines a squared U-shaped receiving groove 213. In use, the four sides of the LCM 23 are respectively inserted into the receiving grooves 213 of the four corresponding side frames 21. However, this configuration does not protect the bottom part of the LCD device 20. In addition, the LCM 23 and the side frames 21 have no positioning configurations, this result in that an assembling of the display device 20 is relatively difficult.

What is needed, therefore, is a new frame, and display device using the same that overcome the above mentioned shortcomings.

SUMMARY

A display device according to a preferred embodiment includes a LCM, a frame receiving and fixing the LCM. The LCM defines a plurality of positioning columns along each edge of a ton surface thereof. The frame includes a frame body having a base and a plurality of sidewalls extending from the peripheral of the base, the base and the sidewalls cooperatively forming a receiving cavity receiving the LCM. Each sidewall of the frame body defines a plurality of first locking elements. Each fixing unit corn a first late and a second plate pendicularly adjoining each other at their corresponding sides. The first plate of each fixing unit defines a plurality of through holes therein corresponding to the positioning columns, and the second plate of each fixing unit defines a plurality of second locking elements therein corresponding to the first locking elements. The first late of h fixing unit is securely bounded with the LCM by inserting the positioning columns into the corresponding through holes, and the second plate of each fixing unit is securely bounded with the sidewall by latching the first locking elements with the corresponding second locking elements, such that each fixing unit is securely bounded with the LCM and the sidewall of the frame body.

Other advantages and novel features will become more apparent from the following detailed description of the preferred embodiments, when taken in conjunction with the accompanying drawings.

BRIEF DESCRIPTION OF THE DRAWINGS

Many aspects of the frame and the related display device having the same can be better understood with reference to the following drawings. The components in the drawings are not necessarily drawn to scale, the emphasis instead being placed upon clearly illustrating the principles of the present frame and the related display device. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present frame and display device using the same, in detail.

Figure 1:
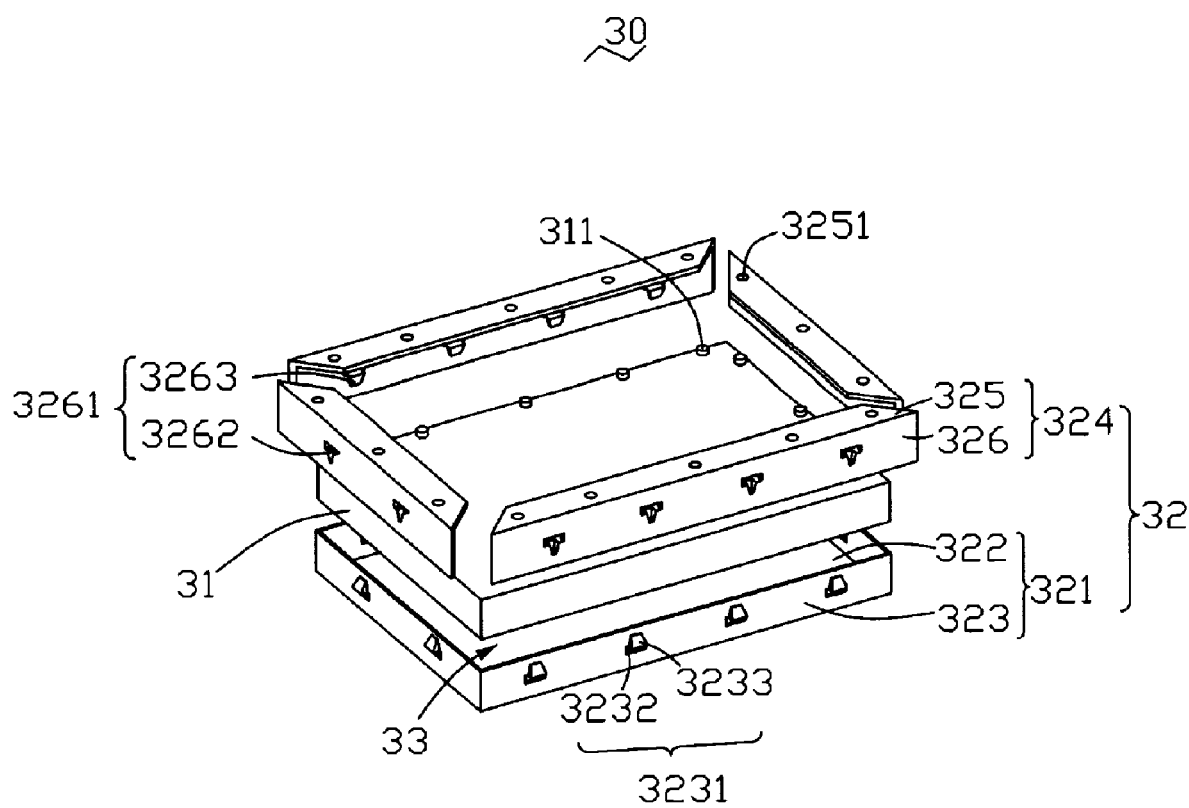
FIG. 1 is a schematic, exploded isometric view of a display device according to a first preferred embodiment.
Figure 2:
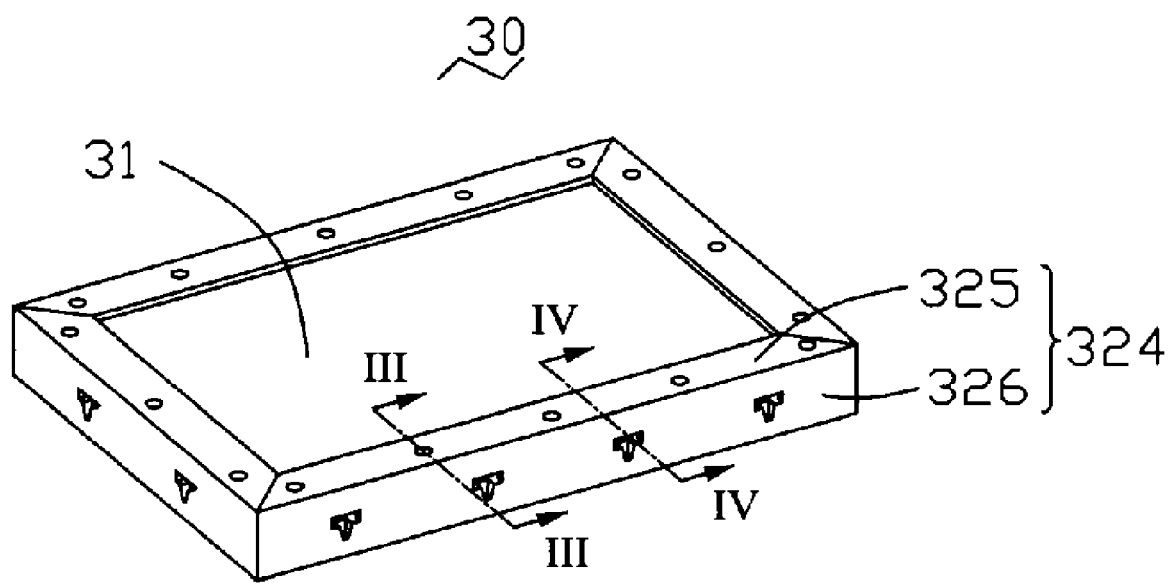
FIG. 2 is a schematic, dissembled isometric view of the display device of FIG. 1.

Referring to FIGS. 1 and 2, a display device 30 in accordance with a first preferred embodiment is shown. The display device 30 includes an LCM 31 and a frame 32. The frame 32 includes a frame body 321 and four fixing units 324. The frame body 321 includes a base 322 and four sidewalls 323 perpendicularly extending from the peripheral of the base 322, the base 322 and the sidewalls 323 cooperatively defining a receiving cavity 33 to receive the LCM 31. The frame 32 may be integrally manufactured by stamping and is formed of metal materials. The base 322 has a rectangular shape. The four fixing units 324 are configured for enclosing the four sidewalls 323 and confining the LCM 31 into the frame body 321 tightly. Each fixing unit 324 includes a first plate 325 and a second plate 326 perpendicularly adjoining each other at their corresponding sides. The first plate 325 of each fixing unit 324 may be securely bounded with the LCM 31 and at the same time the second plate 326 of each fixing unit 324 may be securely bounded with the sidewall 323 of the frame 32.

Figure 4:
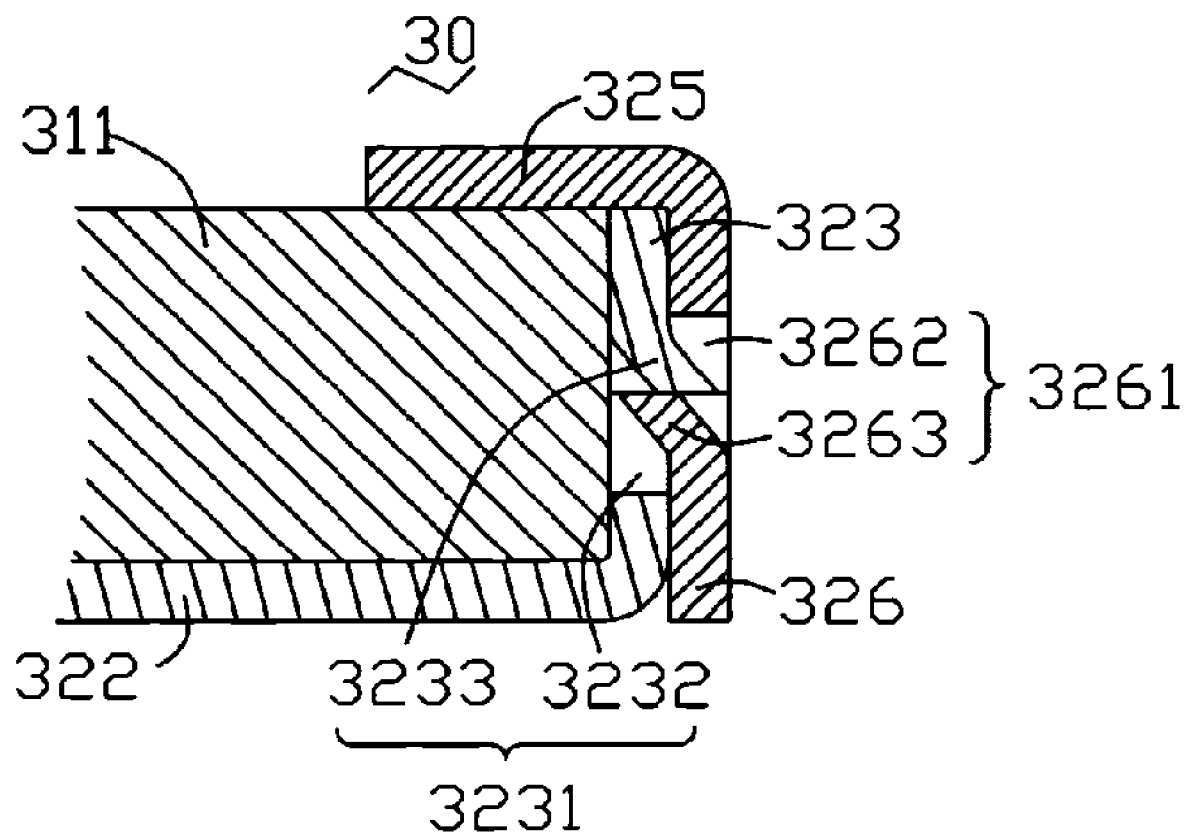
FIG. 4 is a schematic, partially, cross-sectional view taken along a IV-IV line of FIG. 2.

Referring to FIGS. 1 and 4, each sidewall 323 of the frame body 321 defines a plurality of first locking elements 3231 therein. Each first locking element 3231 includes a latching cutout 3232 and a latching protrusion 3233 adjoining the latching cutout 3232. The latching cutout 3232 is configured to be in an inverted T-shaped shape. The latching protrusion 3233 is bent out from portion of the sidewall 323 at a top of the latching cutout 3232 toward an outer area of the frame body 321. The LCM 31 defines a plurality of positioning columns 311 adjacent to the edges of a top surface thereof.

In this embodiment, the first plate 325 is an elongated thin sheet having an isosceles trapezium shape. The second plate 326 is an elongated thin sheet having a rectangular shape extending from a bottom side (not labeled) of the first plate 325 and bending perpendicularly downward from the first plate 325. An elongated length of the second plate 326 is equal to that of the bottom edge of the isosceles trapezium of the first plate 325. Accordingly, the first and second plates 325 and 326 cooperatively form a L-shaped structure. Slanted side angles (not labeled) at the ends the first plate 325 are preferably configured to be 45 degrees, thus, when the fixing unit 324 is arranged with an adjacent fixing unit 324 at the slanting ends thereof, a perpendicular corner may be defined between the two adjacent first plates 325 of the two adjacent fixing units 324. In order to match with the sidewalls 323 of the frame 32, the length of the fixing unit 324 is configured to be equal to that of the corresponding sidewall 323. It is to be understood that each fixing unit 324 may also be integrally formed of stamping a thin metal sheet.

Figure 3:
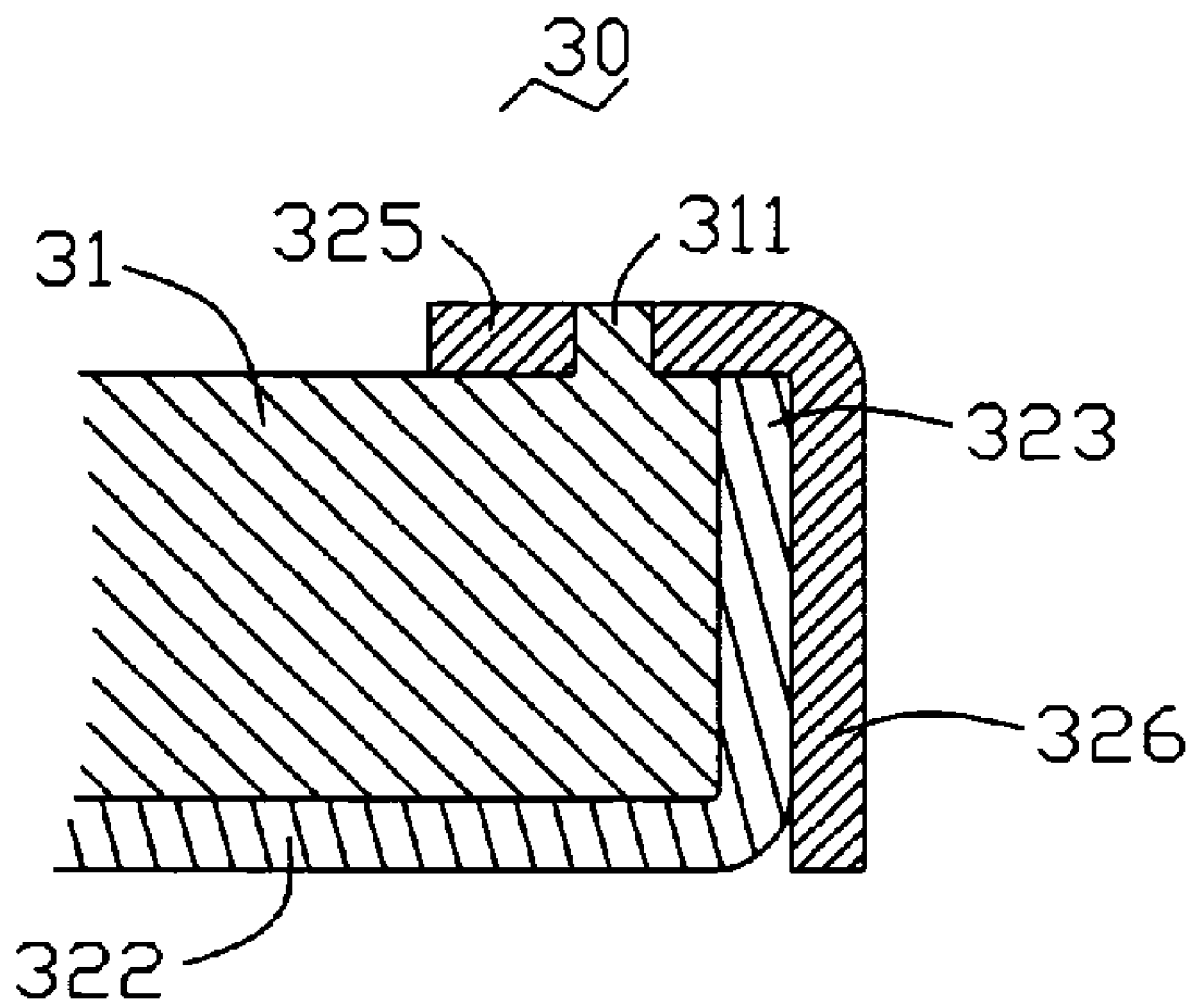
FIG. 3 is a schematic, partially, cross-sectional view taken along a 111-111 line of FIG. 2.

Referring to FIGS. 1, 3, and 4, the first plate 325 of each fixing unit 324 defines a plurality of through holes 3251 therein corresponding to the positioning columns 311 of one edge of the LCM 31. The second plate 326 of each fixing unit 324 defines a plurality of second locking elements 3261 therein corresponding to the first locking elements 3231 of the frame body 321. Each second locking element 3261 includes a latching cutout 3262 and a latching protrusion 3263. The latching cutout 3262 is configured to be a T-shaped shape according to the latching cutout 3232. The latching protrusion 3263 is bent out from portion of the second plate 326 at a bottom of the latching cutout 3262 toward an inner area of the frame body 321.

In this embodiment, the first plate 325 of each fixing unit 324 is securely bounded with the LCM 31 by inserting the positioning columns 311 into the corresponding through holes 3251. The second plate 326 of each fixing unit 324 is securely connected with the sidewall 323 by latching the first locking elements 3231 with the corresponding second locking elements 3261. When the first locking element 3231 is latched with the corresponding second locking element 3261, the latching protrusion 3233 of the sidewall 323 inserts into the latching cutout 3262 of the fixing unit 324 and the latching protrusion 3263 of the fixing unit 324 inserts into the latching cutout 3232 of the sidewall 323. Accordingly, the four fixing units 324 cooperatively confine the LCM 31 into the receiving cavity 33 of the frame 32 tightly around the sidewalls 323.

It should be noted that the LCM 31 can be selected from any conventional LCM. If the present LCM includes a backlight module and a liquid crystal display panel, the backlight module includes a light guide plate and at least a light source. The positioning columns 311 may be defined on the light guide plate.

Compared with conventional frame designs, the present frame design do not need to configure an upper frame, and the present fixing units 324 may be integrally formed by stamping a metal sheet without wasting materials. In addition, because the LCM 31, the frame body 321 and the fixing units 21 both have positioning configurations (i.e. the positioning columns 311, the second locking elements 3261 and the first locking elements 3231), assembling the display device 30 is more efficient.

Figure 5:
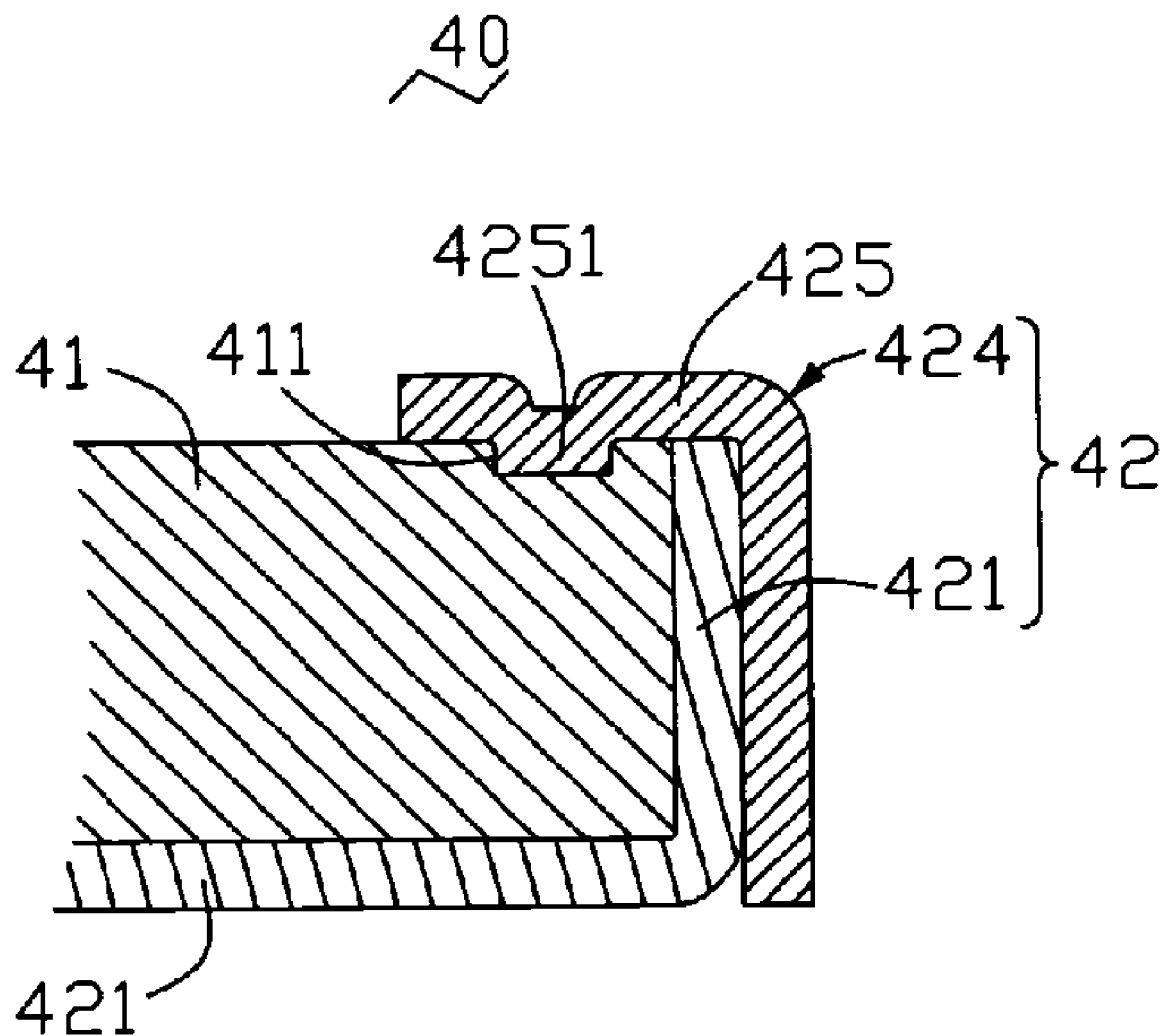
FIG. 5 is a schematic, partially, cross-sectional view of a display device according to a second preferred embodiment.

Referring to FIG. 5, a display device 40 in accordance with a second preferred embodiment. The display device 40 includes an LCM 41 and a frame 42. The frame 42 includes a frame body 421 and four fixing units 424. The display device 40 is similar in principle to that of the first embodiment, except that a plurality of positioning columns 4251 are defined on an inner surface of a first plate 425 of each fixing unit 424, and a plurality of positioning depressions 411 are defined on edges of top surface of the LCM 41 according to the positioning columns 4251. In this embodiment, the first plate 425 of each fixing unit 424 is securely connected with the LCM 41 by inserting the positioning columns 4251 into the corresponding positioning depressions 411.

Figure 6:
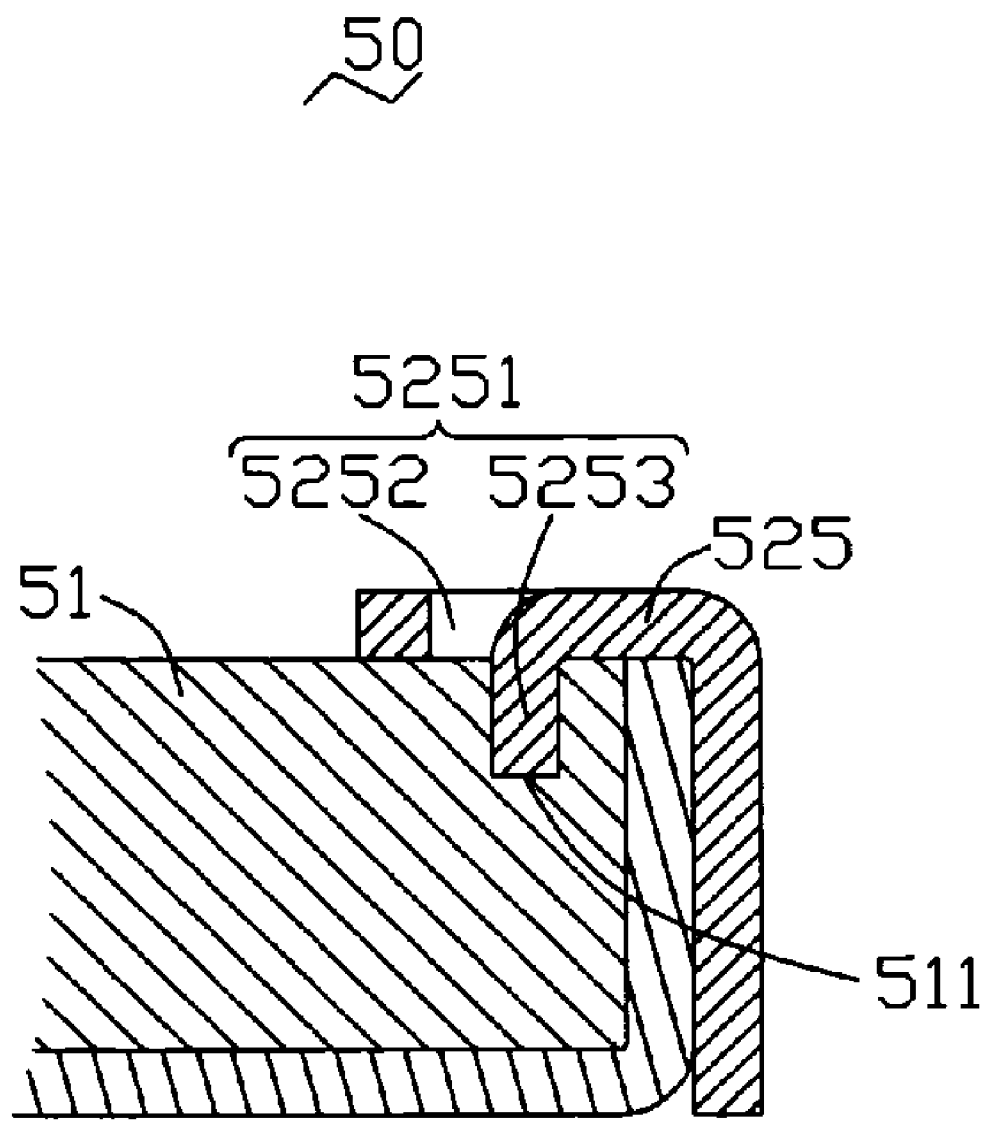
FIG. 6 is a schematic, partially, cross-sectional view of a display device according to a third preferred embodiment.

Referring to FIG. 6, a display device 50 in accordance with a third preferred embodiment. The display device 50 is similar in principle to that of the second embodiment, except that a plurality of third locking elements 5251 are defined in the first plate 525 according to a plurality of positioning depressions 511 defined in the LCM 51. The third locking elements 5251 are similar to the first and second locking elements 3231 and 3261. Each third locking element 5251 includes a latching cutout 5252 and a latching protrusion 5253 extending from an inner surface of the latching cutout 5252 and bending towards the LCM 51. In this embodiment, the first plate 525 is securely connected with the LCM 51 by inserting the latching protrusion 5253 into the corresponding positioning depressions 511 of the LCM 51.

Figure 7:
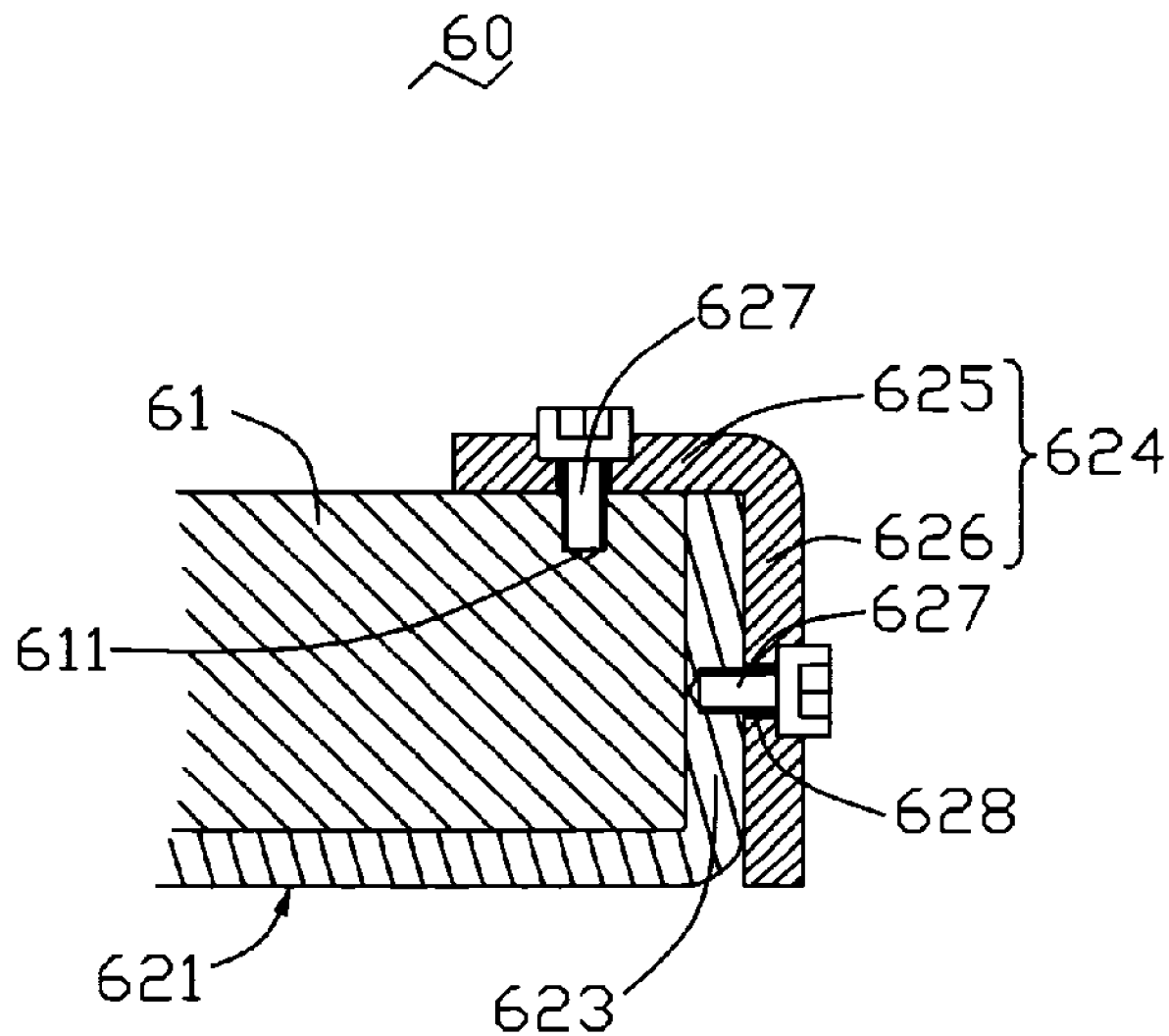
FIG. 7 is a schematic, partially, cross-sectional view of a display device according to a fourth preferred embodiment.
Figure 8:
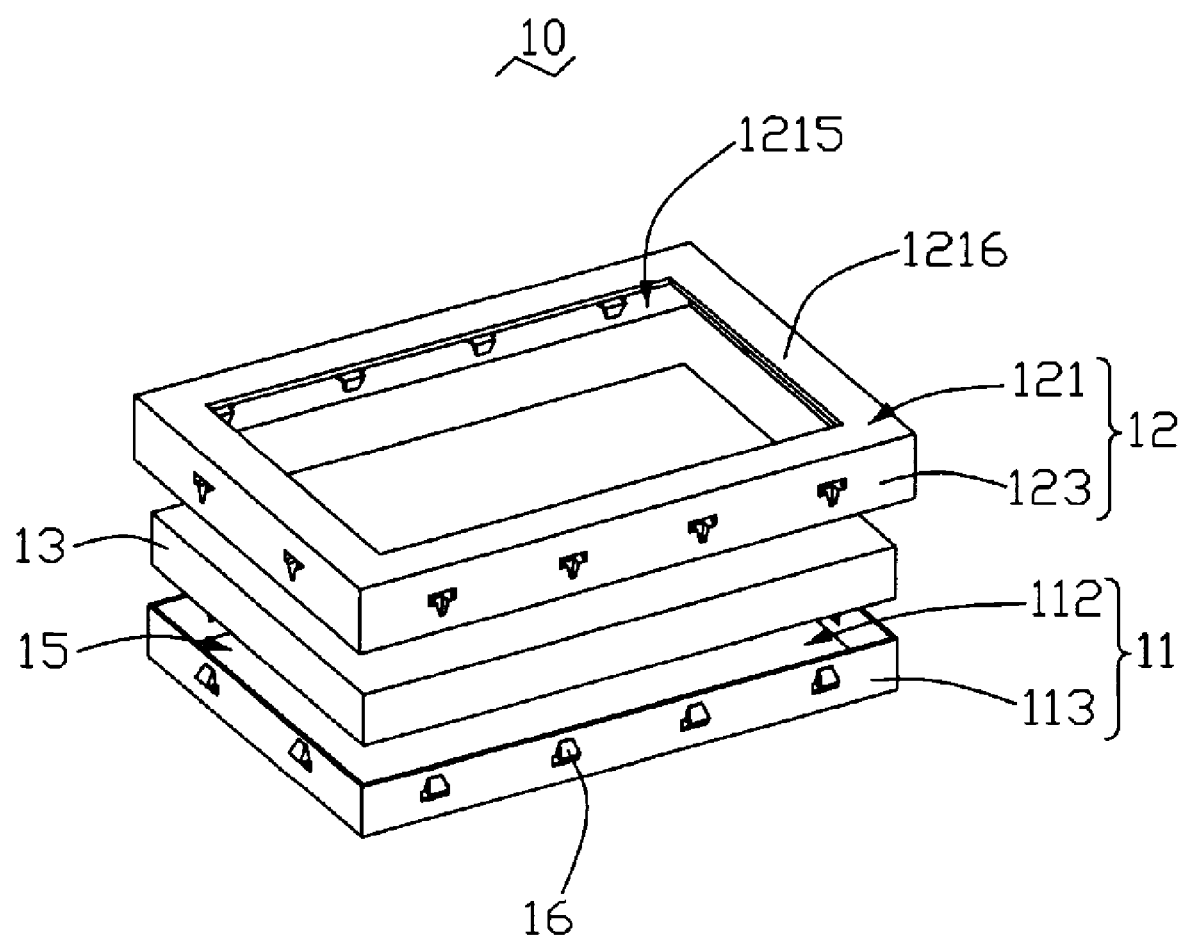
FIG. 8 is a schematic, exploded isometric view of a conventional frame employed by a typical liquid crystal display device.
Figure 9:
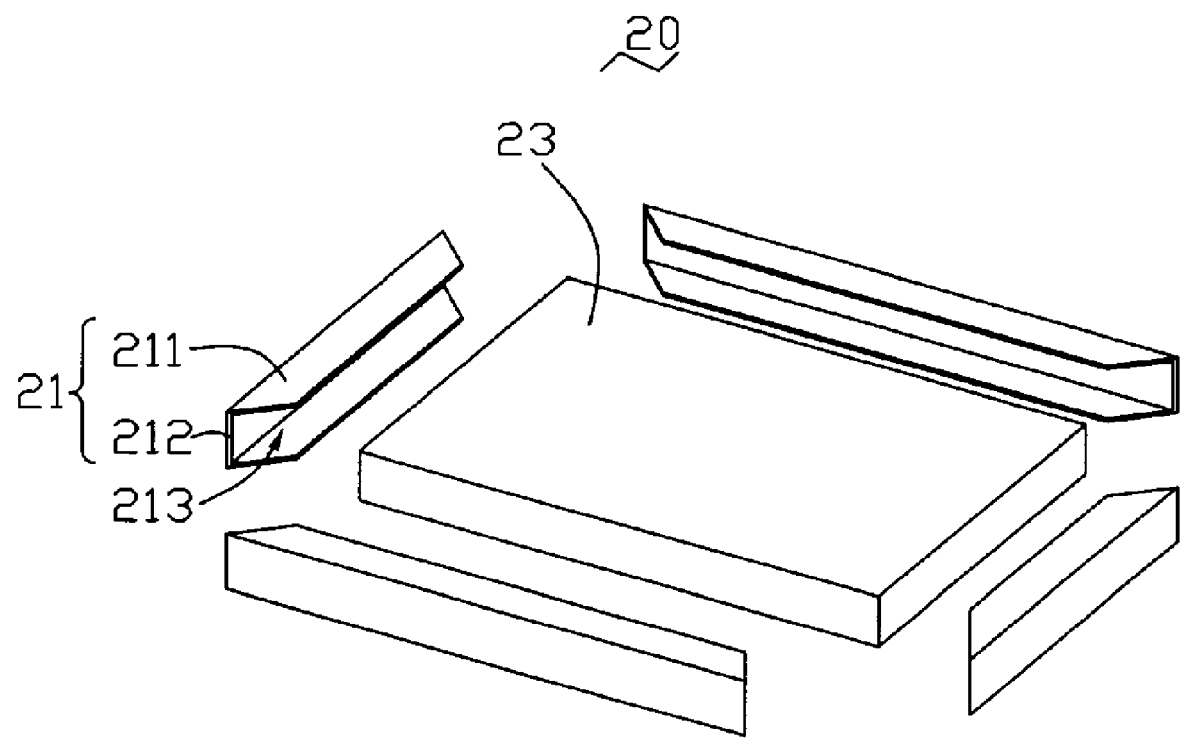
FIG. 9 is a schematic, exploded isometric view of another conventional frame employed by a typical liquid crystal display device.

Referring to FIG. 7, a display device 60 in accordance with a second preferred embodiment. The display device 60 is similar in principle to that of the first embodiment, except that fixing units 624 are securely connected with the sidewalls 623 and LCM 61 by a plurality of screws 627. A plurality of screw holes 628 are respectively defined on the sidewall 623 and the second plate 626 to replace the first and second locking elements 3231 and 3261 of the display device 30. In addition, a plurality of screw holes 628 are defined in the first plate 625 and LCM 61 to replace the through holes 3251 and the positioning columns 311 of the display device 30. In this embodiment, the first plate 625 of each fixing unit 624 is securely connected with the LCM 61 by a plurality of screws 627 being locked into the screw holes 628 of the first plate 625 and LCM 61. The second plate 626 of each fixing unit 624 is securely connected with the sidewall 623 by a plurality of screws 627 being locked into the screw holes 628 of the sidewalls 623 and the second plate 626.

In this embodiment, the screw holes 628 of the first plate 625 and positioning depressions 611 of the LCM 61 may be omitted, because the second plates 626 of the fixing units 624 are locked into the sidewalls 623 tightly and the first plates 625 press the LCM 61, thereby the LCM 61 would not be popped out of the frame body 621.

It is to be understood that the present frame and the present fixing unit may be also formed of plastic or the other suitable materials. It should be noted that the present fixing unit and the frame body may defines other suitable fixing configurations thereon, to make the fixing unit being securely bounded with the LCM and the sidewalls of the frame body. For example, the second plate of each fixing unit can be securely connected with the sidewall by a double-coated adhesive tape adhesively sandwiched between the sidewalls and the second plate.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A display device comprising:
  a liquid crystal module, the liquid crystal module defining a plurality of positioning columns alone each edge of a ton surface thereof; and
  a frame, the frame including a frame body having a base and a plurality of sidewalls extending from the peripheral of the base, the base and the sidewalls cooperatively forming a receiving cavity receiving the liquid crystal module therein, each sidewall of the frame body defining a plurality of first locking elements therein, and a plurality of fixing units enclosing the sidewalk and confining the liquid crystal module into the receiving cavity of frame body, each fixina unit comprising a first plate and a second plate perpendicularly adjoining each other at their corresponding sides, the first plate of each fixing unit defining a plurality of through holes therein corresponding to the positioning columns, and the second plate of each fixing unit defining a plurality of second locking elements therein corresponding to the first locking elements,
  wherein the first plate of each fixing unit is securely bounded with the liquid cystal module by inserting the positioning columns into the corresponding through holes, the second plate of each fixing unit is securely bounded with the sidewall by latching the first locking elements with the corresponding second locking elements, such that each fixing unit is securely bounded with the liquid crystal module and the sidewall of the frame body.

2. The display device according to claim 1, wherein the first plate and the second plate cooperatively forms an L-shaped structure.

3. The display device according to claim 1, wherein the first plate is an elongated thin sheet having an isosceles trapezium shape, and the second plate is an elongated thin sheet having a rectangular shape extending from a bottom edge of the first plate and bending perpendicularly downward from the first plate.

4. The display device according to claim 1, wherein each first locking element includes a first latching cutout and a first latching protrusion bent out from portion of the sidewall at a top part of the first latching cutout toward an outer area of the frame body, each first latching cutout having an inverted T-shaped shape; each second locking clement includes a second latching cutout and a second latching protrusion bent out from portion of the second plate at a bottom part of the second latching cutout toward an inner area of the frame body, each second latching cutout having a T-shaped shape, the first latching protrusion inserting into the second latching cutout of the fixing unit and the second latching protrusion of the fixing unit inserting into the latching cutout of the sidewall.

* * * * *